Aug. 21, 1923. Re. 15,679

R. B. STIPES ET AL

WHEEL HOLDING DEVICE

Original Filed Oct. 11, 1920

Inventor
Reuben B. Stipes
John D. Goodwin,
Howard C. Welch,
By
Attorney

Reissued Aug. 21, 1923. Re. 15,679

UNITED STATES PATENT OFFICE.

REUBEN B. STIPES, JOHN D. GOODWIN, AND HOWARD C. WELCH, OF FLINT, MICHIGAN.

WHEEL-HOLDING DEVICE.

Original No. 1,411,531, dated April 4, 1922, Serial No. 416,006, filed October 11, 1920. Application for reissue filed January 10, 1923. Serial No. 611,823.

*To all whom it may concern:*

Be it known that we, REUBEN B. STIPES, JOHN D. GOODWIN, and HOWARD C. WELCH, citizens of the United States of America, residing at Flint, in the county of Genesee and State of Michigan, have invented certain new and useful Improvements in Wheel-Holding Devices, of which the following is a specification, reference being had therein to the accompanying drawings.

Our invention aims to provide a metallic chock and wheel holding device as a substitute for the ordinary wooden chock or block which is placed in engagement with the wheels of an automobile or similar vehicle to prevent movement of the vehicle during transportation.

Our invention further aims to provide a simple, durable and inexpensive metallic chock or wheel holding device that may be easily and quickly installed to firmly hold a vehicle wheel, without injury to the tire or any part of the wheel.

The mechanical construction entering into our device will be hereinafter specifically described and then claimed, and reference will now be had to the drawing, wherein—

Figure 1:
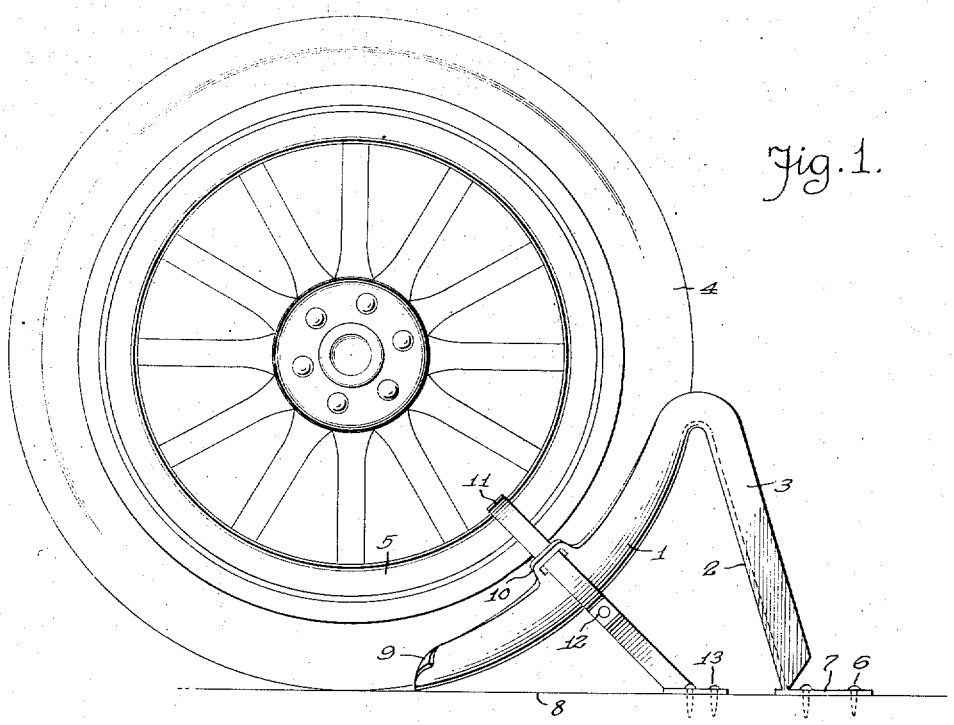
Figure 1 is a side elevation of the device in connection with a vehicle wheel.
Figure 3:
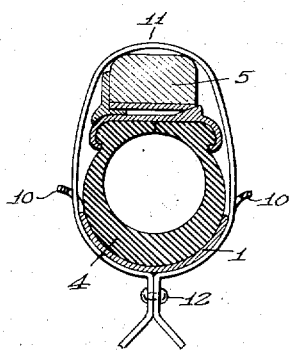
Fig. 3 is a cross sectional view of the device.
Figure 2:
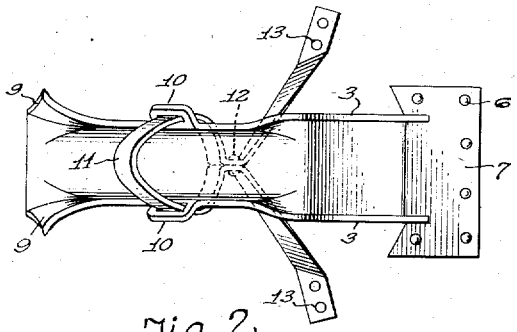
Fig. 2 is a plan of the same without the wheel.

A device in accordance with our invention is made of a channel bar bent and shaped to provide a wheel engaging member 1 and an angularly disposed leg 2, said member and leg having continuous side flanges 3 which add rigidity to the leg 2 and afford a seat for the tire 4 of a wheel 5 against which the member 1 is placed.

The angularly disposed bracing leg 2 retains its natural channel shape, but has its lower end cut and stamped to provide a laterally extending anchoring plate or foot 7 that may be secured to a car floor 8 or other support by nails 6 or suitable fastening means.

The wheel engaging member 1 has its cross sectional shape changed so that said member will be semi-cylindrical throughout its length and thus afford a seat for a portion of the tire 4. The lower end of the wheel engaging member 1 extends as far as possible under the tire 4 and the lower end of said member is somewhat flared, with its side flanges turned outwardly, as at 9, so that when wedging the wheel engaging member 1 under the tire 4 the tire will not be injured.

The side flanges of the wheel engaging member 1 are provided with opposed slotted ears 10 and adapted to extend through these slotted ears and transversely of the felly of the wheel 5, between spokes thereof, is a malleable metallic strap 11, said strap extending under the wheel engaging member 1 with its ends connected together, as at 12 and then bent in diverging directions to the floor 8, where the ends of the strap are secured by nails 13 or other fastening means. With the ends of the strap 11 connected under the wheel engaging member 1 and then extending to the floor 8, another brace or tripod is formed which will co-operate with the bracing leg 2 in further resisting end thrust, by the wheel 5, against the wheel engaging member 1. With the strap 11 passing around a portion of the wheel and wheel engaging member the wheel will be retained in engagement with the member, and with our device properly anchored on a car floor it is practically impossible for the wheel to become accidentally displaced due to any jarring or vibrating of a car during shipment.

We attach considerable importance to the continuous flanges 3 of the member 1 and the leg 2 as these flanges insure proper rigidity and preclude any buckling of the leg or member due to shock to which the device may be subjected when in use. We also consider the shape of the device an advantage as a multiplicity of the devices may be nested and suitably connected together for return shipment.

While in the drawing there is illustrated a preferred embodiment of our invention it is to be understood that the structural elements are susceptible to such variations and modifications as fall within the scope of the appended claims.

What we claim is:—

1. A wheel holding device comprising a wheel engaging member having an angularly disposed leg adapted to be secured to a floor, and a strap extending through portions of said wheel engaging member over the felly of a wheel against said wheel engaging member and having its ends secured to the floor.

2. A wheel holding device as in claim 1, characterized by the strap having connected portions under said wheel engaging member.

3. A wheel holding device comprising a wheel engaging member having an angularly disposed leg provided with slotted ears, and means extending through the slotted ears and affording another angular leg for said device.

4. A wheel holding device as in claim 3, characterized by said means embracing said wheel engaging member and a portion of a wheel and having diverging ends.

5. As a new article of manufacture, a metallic wheel chock made of a single piece of material pressed and bent approximately at its middle portion to afford a wheel engaging member having side flanges over its middle portion extending approximately to the ends of said member, the side flanges at the middle portion of said member reinforcing the bend of said member.

6. As a new article of manufacture, a wheel engaging member substantially inverted V shape in elevation affording floor engaging legs, one of which legs is imperforate and conforms in its longitudinal direction to the arc of a wheel and in cross section approximates the cross section of a tire on the wheel, and the other leg being channel shaped with the side flanges thereof a continuation of the walls of the first mentioned leg, the juncture of said legs forming a relatively sharp inverted U-shaped bend with the last mentioned leg extending downwardly at a tangent to the wheel tire.

7. A shipping frame for transportation of a wheeled vehicle on a platform which consists of a channel iron member bent intermediate its ends forming two legs at an angle one to the other, one of the legs being arcuate in form and adapted to be positioned to engage the wheel from about the point of its contact with the platform part way about the periphery, the other leg providing a brace engaging the platform at the end, the said end being provided with an apertured foot portion for securing to the platform, and means for securing the wheel to the arcuate leg.

In testimony whereof we affix our signatures in the presence of two witnesses.

REUBEN B. STIPES.
JOHN D. GOODWIN.
HOWARD C. WELCH.

Witnesses:
HELEN M. KELLY,
JOHN PICKERING.